United States Patent
Hlava (12) 
(10) Patent No.: US 6,681,265 B1
(45) Date of Patent: Jan. 20, 2004

(54) PROVIDING COMMAND FILES WITH ACCESS TO DATA STORES THAT ARE INACCESSIBLE TO COMMAND LINE OPERATIONS

(75) Inventor: Alan Hlava, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,503

(22) Filed: Apr. 27, 2000

Related U.S. Application Data (60) Provisional application No. 60/163,112, filed on Nov. 2, 1999.

(51) Int. Cl.[7] ............................................. G06F 9/54
(52) U.S. Cl. ................................... 709/328; 713/1
(58) Field of Search ................................ 709/320, 328, 709/329; 713/1, 2, 100

(56) References Cited

U.S. PATENT DOCUMENTS

| | | | | |
|---|---|---|---|---|
| 5,367,686 A | * | 11/1994 | Fisher et al. | 717/174 |
| 5,696,975 A | | 12/1997 | Moore et al. | 395/712 |
| 5,732,269 A | | 3/1998 | Compton et al. | 395/680 |
| 5,740,431 A | * | 4/1998 | Rail | 707/200 |
| 5,742,829 A | | 4/1998 | Davis et al. | 395/712 |
| 5,761,499 A | | 6/1998 | Sonderegger | 395/610 |
| 5,771,381 A | * | 6/1998 | Jones et al. | 713/100 |
| 5,835,769 A | | 11/1998 | Jervis et al. | 395/701 |
| 6,065,116 A | * | 5/2000 | Isaacson et al. | 713/1 |
| 6,167,567 A | * | 12/2000 | Chiles et al. | 717/173 |

(List continued on next page.)

OTHER PUBLICATIONS

"How .INI Files Are Mapped to the Registry", Downloaded from http://msdn.microsoft.com/library/winresource/dn-winnt/S84B4.HTM on Oct. 12, 1999, 2 pages.

"Windows for MS–DOS on Windows NT", Downloaded from http://msdn.microsoft.com/library/winresource/dn-winnt/S84B3.HTM on Oct. 12, 1999, 1 page.

(List continued on next page.)

Primary Examiner—St. John Courtenay, III
(74) Attorney, Agent, or Firm—Blakely Sokoloff Taylor Zafman LLP (57) ABSTRACT

According to the invention, systems and methods are disclosed for allowing command files to access information in a data store. This method consists of executing a first, original command file. A second, temporary command file is then created by a command file generator program. The temporary command file includes one or more commands based upon information from a data store that is accessible only by way of an Application Programming Interface (API). Information from the data store is then used during execution of the temporary command file. The original command file defines the scope of temporary environmental variables for storing information to be retrieved from the data store by a command file generator program and stored in the temporary command file, executes the temporary command file, branches around the operations contained in the body of the original command file which have been performed by the temporary command file, and cleans up the local environment. A command file generator, executed by the original command file generates the temporary command file, accesses information from a data stores through Application Programming Interfaces (APIs) associated with the data store, and generates one or more commands for inclusion in the temporary command file based upon the information retrieved from the data store. The temporary command file stores information retrieved from the data store in one or more local environmental variables, and performs processing based upon the content of the environmental variables and the original command file.

25 Claims, 4 Drawing Sheets

U.S. PATENT DOCUMENTS

| | | | |
|---|---|---|---|
| 6,170,065 B1 * | 1/2001 | Kobata et al. ................. | 714/7 |
| 6,184,998 B1 * | 2/2001 | Tebeka ...................... | 358/1.15 |
| 6,237,092 B1 * | 5/2001 | Hayes, Jr. ................... | 713/100 |
| 6,289,378 B1 * | 9/2001 | Meyer et al. ............... | 709/223 |
| 6,347,331 B1 * | 2/2002 | Dutcher et al. ............. | 709/203 |
| 6,438,749 B1 * | 8/2002 | Chamberlain ............... | 717/174 |
| 6,449,617 B1 * | 9/2002 | Quinn et al. ................ | 707/100 |
| 6,449,642 B2 * | 9/2002 | Bourke-Dunphy et al. . | 709/222 |

OTHER PUBLICATIONS

"Registry Sample: Using the Win32 API to Access the Registry", Downloaded from http://msdn.microsoft.com/library/docdrg.htm on Oct. 12, 1999, 2 pages.

"Initialization Files and the Registry", Downloaded from http://msdn.microsoft.com/library/winresource/dnwinnt/S84B0.HTM on Oct. 12, 1999, 1 page.

"Summary of Administrative Tools for the Registry", Downloaded from http://msdn.microsoft.com/library/winresource/dnwinnt/S8489.HTM on Oct. 12, 1999, 1 page.

"Editing Values in the Registry", Downloaded from http://msdn.microsoft.com/library/winresource/dnwinnt/S8472.HTM on Oct. 12, 1999, 3 pages.

"Finding a Key in the Registry", Downloaded from http://msdn.microsoft.com/library/winresource/dnwinnt/S846F.HTM on Oct. 12, 1999, 1 page.

"Using Windows NT Diagnostics to View System Configuration Data", Downloaded from http://msdn.microsoft.com/library/winresource/dnwinnt/S8465.HTM on Oct. 12, 1999, 1 page.

"Working in the Registry Editor Windows", Downloaded from http://msdn.microsoft.com/library/winresource/dnwinnt/S8464.HTM on Oct. 12, 1999, 1 page.

"Solving Users' Environment Problems with the Registry", Downloaded from http://msdn.microsoft.com/library/winresource/dnwinnt/S848B.HTM on Oct. 12, 1999, 2 pages.

"Registry Editor and Registry Administration", Downloaded from http://msdn.microsoft.com/library/winresource/dnwinntS8461.HTM on Oct. 12, 1999, 1 page.

"Hives and Files", Downloaded from http://msdn.microsoft.com/library/winresource/dnwinnt/S843F.HTM on Oct. 12, 1999, 4 pages.

"Value Entries in the Registry Keys", Downloaded from http://msdn.microsoft.com/library/winresource/dnwinnt/S843E.HTM on Oct. 12, 1999, 3 pages.

"The Registry Hierarchy", Downloaded from http://msdn.microsoft.com/library/winresource/dnwinnt/S843D.HTM on Oct. 12, 1999, 2 pages.

"How Windows NT Components Use the Registry", Downloaded from http://msdn.microsoft.com/library/winresource/dnwinnt/S843B.HTM on Oct. 12, 1999, 3 pages.

"Getting Started with Registry Editor", Downloaded from http://msdn.microsoft.com/library/winresource/dnwinnt/S8439.HTM on Oct. 12, 1999, 2 pages.

"Windows NT Architectural Modules", Downloaded from http://msdn.microsoft.com/library/winresource/dnwinnt/S8301.HTM on Oct. 12, 1999, 2 pages.

"Windows NT Design Goals", Downloaded from http://msdn.microsoft.com/library/winresource/dnwinnt/S8300.HTM on Oct. 12, 1999, 1 page.

"Low–Level Device Interface", IBM Technical Disclosure Bulletinn vol. 33; No. 3B; Aug. 1990, 3 pages (312–314).

"Configuration File Comprising Configuration Commands and Data", IBM Technical Disclosure Bulletin vol. 28; No. 4; Sep. 1985, 1 page (1441).

* cited by examiner

```
                                                                    400
┌─────────────────────────────────────────────────────────────┐
│  1    @echo off                                             │
│  2    setlocal                                              │
│  3    cmdbid foo.cmd                                        │
│  4    cmd/c %TEMP%\foo.cmd %1 %2 %3 %4 %5 %6 %7 %8 %9       │
│  5    erase %TEMP%\foo.cmd                                  │
│  6    goto end_body                                         │
│  7                                                          │
│  8    mkdir"%BASEDIR%"                                      │
│  9    mkdir"%BASEDIR%\servers"                              │
│  10   mkdir"%BASEDIR%\printers"                             │
│  11   mkdir"%BASEDIR%\queues"                               │
│  12   mkdir"%BASEDIR%\acl"                                  │
│  13   mkdir"%BASEDIR%\acl\groups"                           │
│  14                                                         │
│  15   :end_body                                             │
│  16   endlocal                                              │
└─────────────────────────────────────────────────────────────┘
```

HEADER 410: lines 1–6
BODY 420: lines 7–13
FOOTER 430: lines 14–16

FIG. 4

```
                                                    500
┌──────────────────────────────────────────────┐
│  1    @echo off                              │
│  2    setlocal                               │
│  3    setBASEDIR = c:\programs\bar;          │
│  4    mkdir"%BASEDIR%"                       │
│  5    mkdir"%BASEDIR%\servers"               │
│  6    mkdir"%BASEDIR%\printers"              │
│  7    mkdir"%BASEDIR%\queues"                │
│  8    mkdir"%BASEDIR%\acl"                   │
│  9    mkdir"%BASEDIR%\acl\groups"            │
└──────────────────────────────────────────────┘
```

FIG. 5

PROVIDING COMMAND FILES WITH ACCESS TO DATA STORES THAT ARE INACCESSIBLE TO COMMAND LINE OPERATIONS

This application claims the benefit of an earlier provisional application, Ser. No. 60/163,112, filed on Nov. 2, 1999.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of operating systems. More particularly, the invention relates to a method that allows a command file to access a data store, such as the Windows Registry, that is accessible only by way of an Application Programming Interface (API).

2. Description of the Related Art

The Windows® Registry is increasingly used to store application configuration information. Formerly, much of this information was stored in environment variables, which command files (such as files with a .bat or .cmd extensions) could access directly by coding the environment variable name surrounded by percent signs (e.g., "%MYAPPPATH%"). However, there is no way for command files to directly access data stored in the Registry.

Previously, three methods could be used to access data stored in the Registry. First, Registry data can be accessed by coding utility functions as programs rather than command files. Another solution is to duplicate information in both the Registry and in permanent environmental variables and use the environmental variables rather than the Registry. Finally, use of the Registry can be avoided and the information stored in permanent environmental variables only. However, each of these approaches has drawbacks.

To provide access to Registry data, utility functions can be coded as programs rather than command files. These programs can then access the Registry data by using the Windows APIs. However, this method is somewhat inefficient. Programs are more difficult and time consuming to write and maintain than command files. Therefore, this method detracts from developer productivity relative to a method that uses command files to access the Registry data.

Another method of providing access to Registry data is to duplicate the Registry data in permanent environmental variables and access these variables through a command file. This method has the disadvantage of requiring that the Registry data and the environmental variables be kept synchronized. However, it may actually be impossible to keep this data synchronized because the user can use mechanisms outside the applications control such as a Registry editor to manipulate the data. Therefore, the user can, either intentionally or inadvertently, create a situation in which the Registry data and the environmental variables are no longer synchronized.

Finally, the problem of accessing the Registry data can be avoided altogether by simply using permanent environmental variables in place of the Registry. As with the method that duplicates the Registry data in environmental variables, this method provides access to the environmental variables through a command file. However, this approach is contrary to Microsoft's policy of making the Registry the repository for application configuration type information.

SUMMARY OF THE INVENTION

According to one aspect of the invention, a method of allowing command files to access information in a data store is provided. This method consists of executing a first, original command file. A second, temporary command file is then created. The temporary command file includes one or more commands based upon information from a data store that is accessible by way of an Application Programming Interface (API). Information from the data store is then used during execution of the temporary command file.

In one embodiment, the original command file defines the scope of temporary environmental variables for storing information to be retrieved from the data store by a command file generator program and stored in the temporary command file, executes the temporary command file, branches around the operations contained in the body of the original command file which have been performed by the temporary command file, and cleans up the local environment. A command file generator, executed by the original command file generates the temporary command file, accesses information from a data stores through Application Programming Interfaces (APIs) associated with the data store, and generates one or more commands for inclusion in the temporary command file based upon the information retrieved from the data store. The temporary command file stores information retrieved from the data store in one or more local environmental variables, and performs processing based upon the content of the environmental variables and the original command file.

Advantageously, this method allows command files to access a data store such as the Windows Registry without some of the problems associated with prior approaches. First, access to the data store can be achieved through a command file which is easier to write and maintain than a program. Secondly, there is no concern about synchronization between the data store and permanent environmental variables used to mimic the data store. Finally, the method allows full use of the data store as intended, that is, as a central repository for configuration type information.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DESCRIPTION OF THE INVENTION

A method is described that allows command files to access data stores that traditionally have been accessible only through an Application Programming Interface (API). Currently, application developers are faced with the choice of (1) coding "utility" functions as programs instead of as command files; (2) duplicating information in both the registry and in permanent environment variables; or (3) not using the registry at all.

By using the first option, the programs can use the Windows APIs to access registry data. However, since command files are far easier to write and maintain than programs, this detracts from developer productivity relative to this invention. In contrast, this invention allows a single program to be written which knows how to access the registry data. This single program can then be used by many different command files.

According to the second option, the application developer duplicates configuration information in both the registry and in permanent environment variables. This has the disadvantage of creating potential synchronization problems between the registry data and the permanent environment variables.

According to the third choice, the registry is not used to store such information. Rather, the information is stored only in permanent environment variables. However, this is contrary to Microsoft's strategy of making the registry the repository for application configuration type information.

Embodiments of the present invention allow registry data to be used from command files without duplicating that information in permanent environment variables. In other words, the application does not need to keep the registry data and a set of permanent environment variables in synch which is actually impossible because users can update either the registry or the environment variables using mechanisms outside the application's control, such as the regedit program and the NT Control Panel.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention will be described with reference to a particular operating system environment, such as Microsoft® Windows®, and a particular data store, e.g., the Windows Registry, the present invention is equally applicable to other operating systems and other types of limited access data stores.

Terminology

Before describing an illustrative environment in which various embodiments of the present invention may be implemented, brief definitions of terms used throughout this application are given below.

A "command file" generally refers to a file containing one or more command line operations. Examples of a command file in a Windows operating system environment include files having .bat or .cmd extensions. Such files are often referred to as scripts.

In the context of this application, a "data store" is a repository for information, such as application configuration type information. As indicated above, embodiments of the present invention provide a mechanism by which command files are able to access information from data stores that is otherwise inaccessible to command line operations. An example of such a controlled access data store is the Windows Registry that is accessed by way of an Application Programming Interface (API).

Computer System Overview

Figure 1:
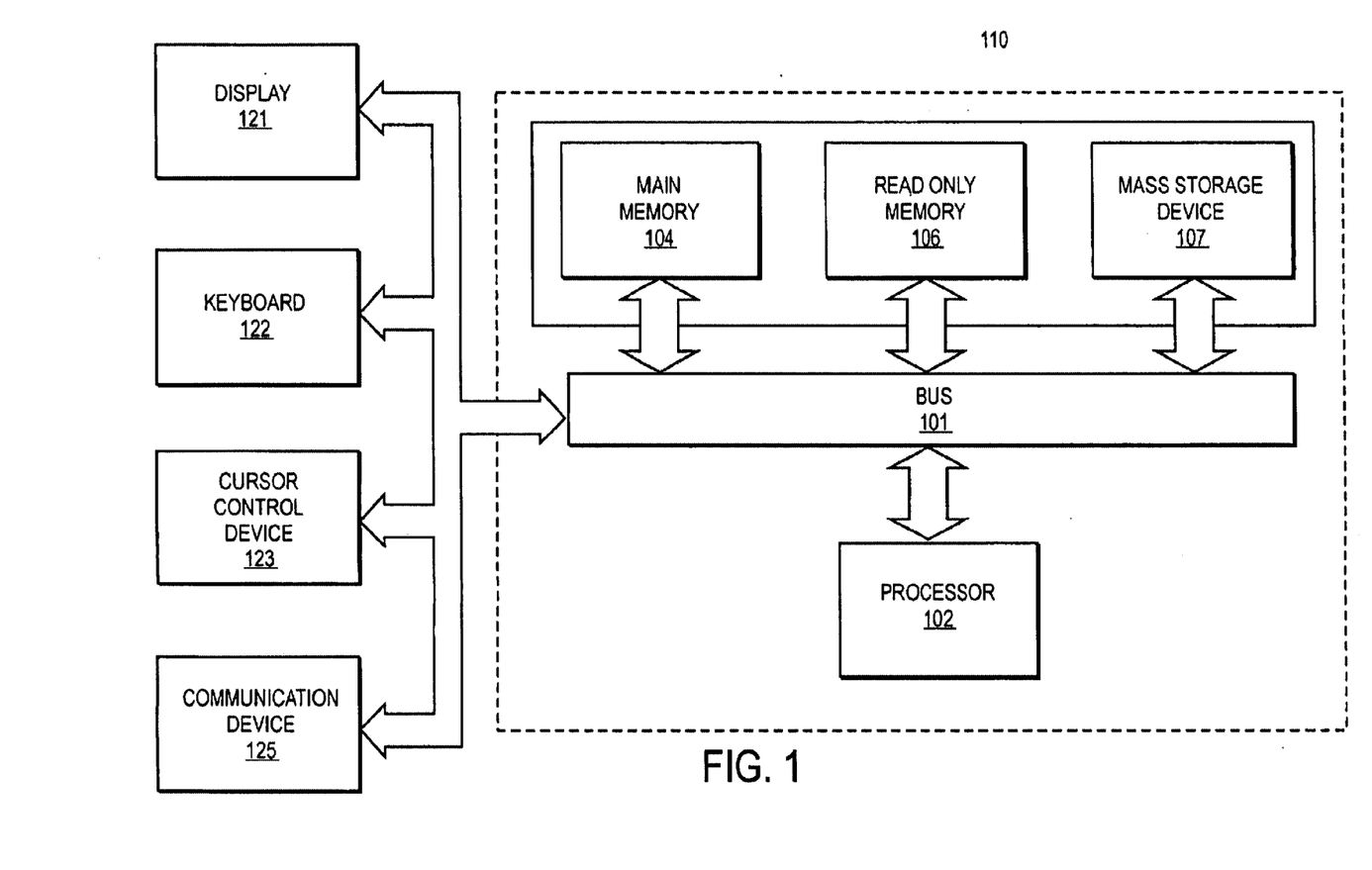
FIG. 1 is an example of a typical computer system upon which one embodiment of the present invention may be implemented.

An exemplary machine in the form of a general purpose computer system 100 in which features of the present invention may be implemented will now be described with reference to FIG. 1. The computer system 100 includes one or more processors 102, memory 110, keyboard 122, cursor control device 123, a communication device 125, and a display device 121, such as a cathode rate tube (CRT) or liquid crystal display (LCD), each coupled to a bus 101.

The processor 102 fetches instructions stored in memory 110 via bus 101 and executes the instructions to perform operations on data, which is also stored in memory 110. Execution of certain sequences of instructions by the processor 102 results in the processor 102 writing data to the display 121 to present information to a user of the computer system 100.

Memory 110 may include main memory 104 (e.g., random access memory), non-volatile storage, such as read-only-memory 106, a mass storage device 107, such as a magnetic disk (e.g., hard disk-drive, a floppy disk-drive), an optical disk, and/or some other computer-readable medium. At any rate, when power is applied to the computer system 100, an operating system (OS) is loaded from non-volatile storage into operating memory by processor 102 or another device, such as a direct memory access controller (not shown), having access to memory 110. Sequences of instructions within the OS are then executed by processor 102 to load other computer programs and portions of computer programs into operating memory from non-volatile storage. As described above, the present invention may be embodied in one or more sequence of instructions which may be stored in a computer-readable medium and executed by processor 102.

Embodiments of the present invention relate to the use of computer system 100 to execute one or more software programs and/or command files within memory 1 10. As will be described further below, in the preferred embodiment, mass storage device 107 contains a data store (not shown) containing configuration information and one or more command files (not shown). The mass storage device 107 also includes a command file generator program (not shown) which when executed by processor 102 extracts configuration information from the data store and generates a temporary command file based upon the configuration information and the one or more command files. In this manner, configuration information that is inaccessible to command line operations may be made available to command files.

A communication device 125 is also coupled to bus 101 to provide access from/to clients/servers via the Internet, for example. The communication device 125 may include a modem, a network interface card, or other well known interface devices, such as those used for coupling to Ethernet, token ring, or other types of networks. In any event, in this manner, the computer system 100 may be coupled to a number of clients/servers via a conventional network infrastructure, such as an enterprise's Intranet (e.g., WAN) and/or the Internet, for example.

It is appreciated that a lesser or more equipped computer system than the example described above may be desirable for certain implementations. Therefore, the configuration of computer system 100 will vary from implementation to implementation depending upon numerous factors, such as price constraints, performance requirements, technological improvements, and/or other circumstances.

It should be noted that, while the steps described herein may be performed under the control of a programmed processor, such as processor 102, in alternative embodiments, the steps may be fully or partially implemented by any programmable or hardcoded logic, such as Field Programmable Gate Arrays (FPGAs), TTL logic, or Application Specific Integrated Circuits (ASICs), for example. Additionally, the method of the present invention may be performed by any combination of programmed general purpose computer components and/or custom hardware components. Therefore, nothing disclosed herein should be construed as limiting the present invention to a particular embodiment wherein the recited steps are performed by a specific combination of hardware components.

Conceptual View

Figure 2:
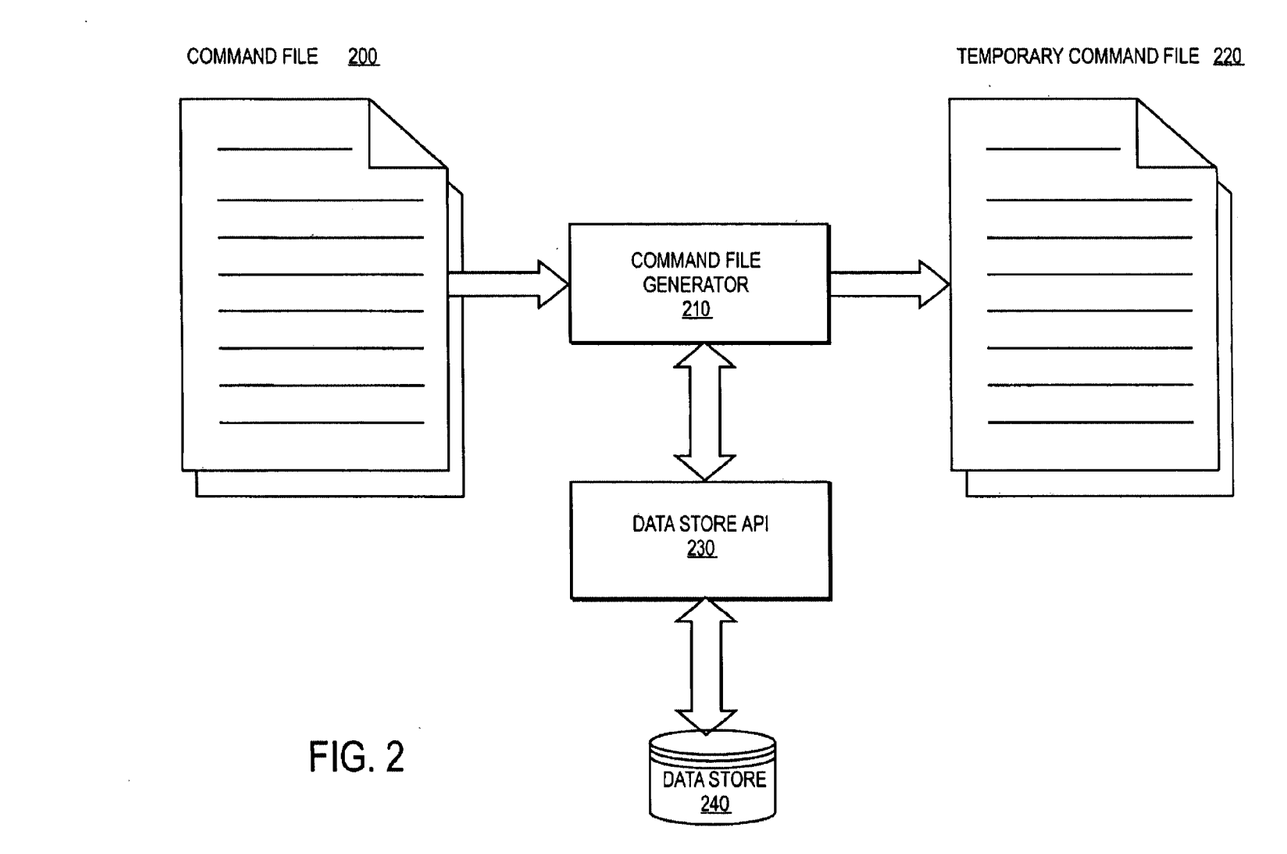
FIG. 2 is a block diagram that conceptually illustrates interactions among entities according to one embodiment of the present invention.

FIG. 2 is a block diagram that conceptually illustrates interactions among entities according to one embodiment of the present invention. Command file 200 is prepared by a developer for the purpose of accessing a data store 240 such as the Windows Registry. This command file 200 executes the command file generator 210. The command file generator 210 provides access to a data store 240 such as the Windows Registry through a data store API 230 such as a Windows Registry API.

The command file generator 210, after accessing the data store 240, produces a temporary command file 220 using information from the data store 240. This temporary command file 220 contains information from the data store 240 and instructions copied from the body of the command file 200. Therefore, execution of the temporary command file 220 performs the functions copied from the command file 200 with the information from the data store 240.

Command File Processing

Figure 3:
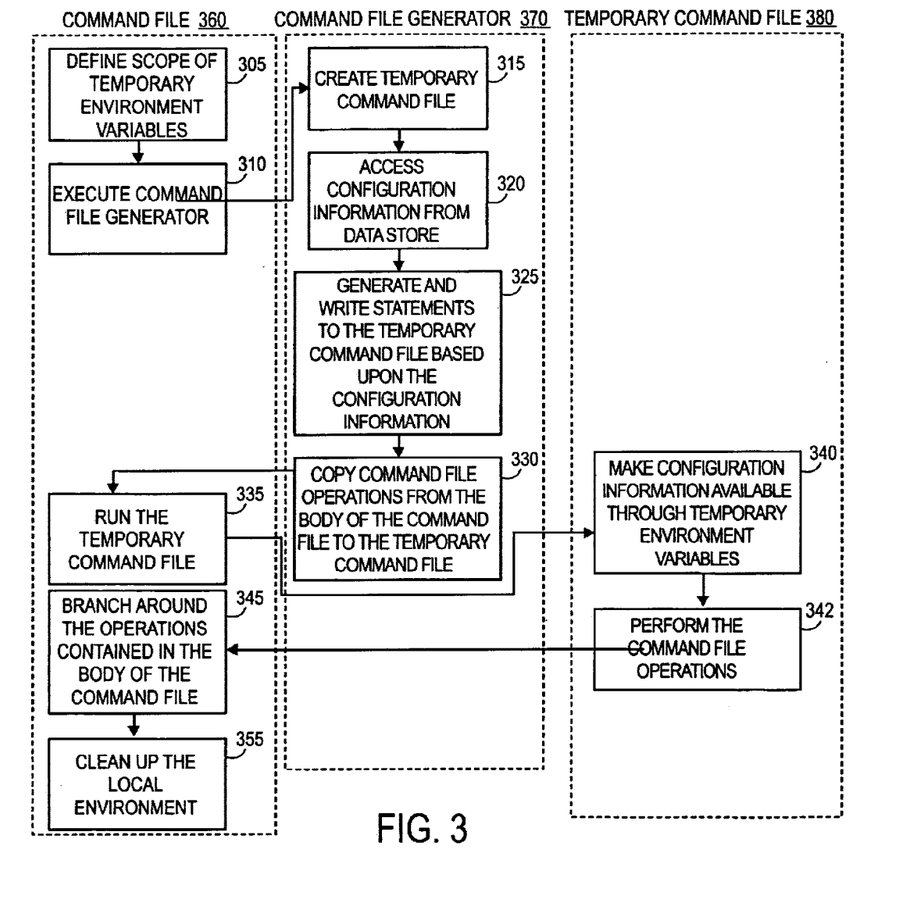
FIG. 3 is a flow diagram illustrating command file processing according to one embodiment of the present invention.

FIG. 3 is a flow diagram illustrating command file processing according to one embodiment of the present invention. In this example, the steps are distributed among a command file 360, a command file generator 370, and a temporary command file 380. After the command file 360 has been invoked, processing begins at step 305. At step 305, the scope for one or more temporary environment variables is defined. That is, the extent to which the temporary environment variables can be referenced is defined. These are the variables into which data store information will be copied. Preferably, the temporary environment variables have a local scope so as to avoid interference with global environment variables. Once the scope of these variables has been defined, processing continues with step 310 where the command file generator program 370 is invoked inside the command file 360.

At this point control passes to the command file generator 370 and the process continues with step 315. At step 315, a temporary command file is created by the command file generator 370 Preferably, the temporary command file 380 has the same name as the command file 360 and is created in a temporary directory separate from the directory in which the command file 360 resides. However, in alternative embodiments, the name of the temporary command file 380 may be different that that of the command file 360 in which case the temporary command file 380 may be created in the same directory as the command file 360.

At step 320, the command file generator 370 accesses configuration information from the data store 240 by way of the data store API 230. The command file generator 370 then generates and writes one or more statements to the temporary command file 380 based upon the configuration information at step 325. For example, as will be illustrated below, the statements may set predetermined temporary environment variables to values of corresponding configuration information thereby making the configuration information accessible by the temporary command file 380.

At step 330, command file operations from the body of the command file 360 are copied into the temporary command file 380. Therefore, execution of the temporary command file 380 will perform the commands from the original command file 360 on the information copied from the data store to the temporary environmental variables. After step 330, control is returned to the command file 360.

At step 335, the command file 360 runs the temporary command file 380. At step 340, the temporary command file 380 makes the configuration information available through temporary environment variables, for example. After making the configuration information available, at step 342, the temporary command file 380 performs the command file operations that were previously copied from the body of the command file 360.

Control then returns to the command file 360. At step 345, since the operations contained in the body of the command file 360 have already been performed by the temporary command file 380, those operations may now be skipped by branching around the body of the command file 360. Finally, since the temporary environmental variables are no longer needed, the local environment is cleaned up at step 350.

Exemplary Command File

Figure 4:
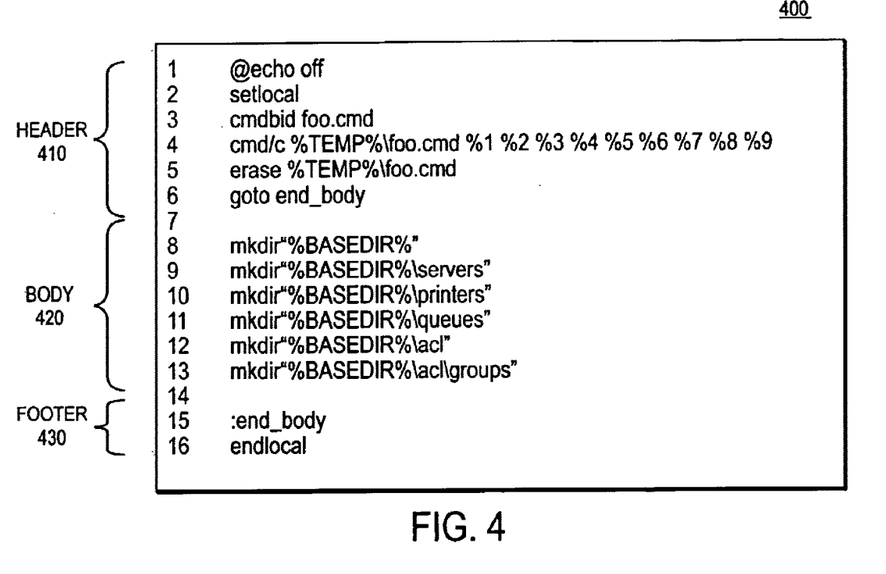
FIG. 4 is an exemplary command file according to one embodiment of the present invention.

FIG. 4 is an exemplary command file 400 according to one embodiment of the present invention. In this example, the command file 400 includes a header 410, a body 420, and a footer 430. The header 410 is essentially "boilerplate" commands that can be added to the front of any command file needing to access registry data. A command file generator program, "cmdbld.exe", is invoked inside the header 410 of the command file 400 to access registry data. The program: (1) reads the application registry data using standard Windows API calls; (2) generates one or more "set" commands that store the registry data in local environment variables whose names are known to the application command file writers. These "set" commands are stored in a generated temporary command file; and (3) scans over the original command file and appends the body 420 (e.g., the non-boilerplate lines) to the generated command file. Then, the original command file runs the generated command file (which uses the generated local environment variables to access the registry data), cleans up, and then branches around the commands contained in the body 420.

In this simple example, the command file 400 creates a number of directories under a configurable application-specific base directory, which is stored in the application's registry data. A line-by-line explanation of this example will now be provided.

Line 1: Turns off command echoing so that the "boilerplate" execution is not visible to the user.

Line 3: This invokes the command file generator program file, passing it the name of the command file.

> The program reads the registry entries for this application (using standard Windows API calls).
>
> It uses these to generate "set" statements, which it stores in a temporary command file in the TEMP directory. This file may have the same name as the command file name the program was passed.
>
> It then reads the command file and scans down past the "boilerplate" code (i.e., to line 7).
>
> It then copies all the lines following the "boilerplate" down through the ":end_body" statement (i.e., lines 7–14 in this example) and appends these lines to the command file in the TEMP directory.
>
> It then returns to the command file which invoked it.

Line 4: This runs the command file in the TEMP directory, which actually does the intended work.

> First, the generated "set" commands run, so that the registry data is available in environment variables local to the command file.
>
> Then, the real lines in the body 420 (7–14, in this example) run using the local environment variable to do the work of the command file.

Line 5: This erases the generated command file in the TEMP directory.

Line 6: This branches around the body 420 of the command file (these commands have already been executed as part of the command file in the TEMP directory).

Line 15: This is the branch point.

Line 16: This cleans up the local environment.

Advantageously, by employing the present invention, command files can be written which use data from the registry by simply adding 6 "boilerplate" lines to the front of the command file and 2 "boilerplate" lines to the end. The rest of the command files are standard Windows commands which use the registry data as it were stored in permanent environment variables.

Exemplary Temporary Command File

Figure 5:
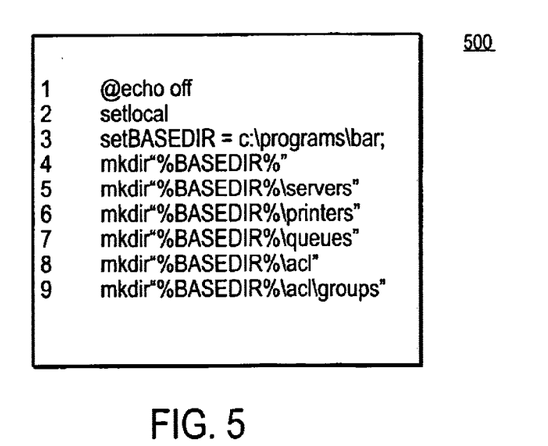
FIG. 5 is an exemplary temporary command file according to one embodiment of the present invention.

FIG. 5 is an exemplary temporary command file 500 according to one embodiment of the present invention. In this simplified example, during step 325 only a single local environment variable, "BASEDIR", is assumed to have been generated and written to the temporary command file.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   creating a temporary command file by executing an original command file,
      during execution of the original command file, retrieving configuration information from a data store by accessing the data store through an Application Programming Interface (API) associated with the data store,
      adding one or more command line operations to the temporary command file that are dependent upon the configuration information;
   executing the temporary command file; and
   utilizing the configuration information retrieved from the data store during execution of the temporary command file.

2. The method of claim 1, further comprising adding one or more set commands to the temporary command file that store the configuration information in one or more environment variables.

3. The method of claim 2, wherein the one or more command line operations make reference to the one or more environment variables.

4. The method of claim 1, wherein said original command file includes:
   a header containing a predetermined set of commands;
   a body containing commands for accessing the configuration information and making the configuration information available through temporary environmental variables; and
   a footer containing commands for cleaning up a local environment.

5. The method of claim 1, wherein the data store comprises a Windows Registry.

6. A method comprising:
   defining a scope for one or more temporary environment variables;
   creating a temporary command file including command line operations contained in a body of an original command file by executing a command file generator program from within the original command file, the command line operations referring to the one or more temporary environment variables;
   executing the temporary command file; and
   during execution of the original command file, branching around the command line operations copied from the body of the original command file.

7. The method of claim 6, further comprising, prior to said executing the temporary command file, retrieving configuration information to be associated with the one or more temporary environment variables from a data store by accessing the data store through an Application Programming Interface (API) associated with the data store.

8. The method of claim 7, wherein the scope of the one or more temporary environmental variables is local to the original command file and/or the temporary command file.

9. A method comprising:
   executing a program from within an original command file;
   the program creating a temporary command file;
   the program accessing configuration information from one or more data stores; and
   the program generating one or more command line operations for inclusion in the temporary command file based upon the configuration information retrieved from the one or more data stores.

10. The method of claim 9, wherein a name of the temporary command file is the same as the original command file, and wherein the temporary command file is created in a temporary directory separate from a directory in which the original command file is located.

11. The method of claim 9, wherein said accessing the configuration information from one or more data store is performed by way of one or more Application Programming Interfaces (APIs) associated with the one or more data stores.

12. A computer system comprising:
   a storage device having stored therein a routine for allowing command files to access configuration information in a data store which is accessible by way of an Application Programming Interface (API); and
   a processor coupled to the storage device to execute the routine, where:
      an original command file creates a temporary command file, the temporary command file including one or more commands copied from the original command file; and
      the temporary command file executes the one or more commands copied from the original command file based upon the information in the data store.

13. The computer system of claim 12, wherein the original command file includes:
   a header containing a predetermined set of commands;
   a body containing commands for accessing the configuration information and making the configuration information available through temporary environmental variables; and
   a footer containing one or more commands for deallocating the temporary environment variables.

14. The computer system of claim 12, wherein the data store comprises a Windows registry.

15. A machine-readable medium having stored thereon data representing sequences of instructions, the sequences of instructions which, when executed by a processor, cause the processor to:
   creating a temporary command file by
      executing an original command file,
         during execution of the original command file, retrieving configuration information from a data store by accessing the data store through an Application Programming Interface (API) associated with the data store,
         adding one or more command line operations to the temporary command file that are dependent upon the configuration information;
      executing the temporary command file; and
      utilizing the configuration information retrieved from the data store during execution of the temporary command file.

16. The machine-readable medium of claim 15, the sequences of instructions further causing the processor to add one or more set commands to the temporary command file that store the configuration information in one or more environment variables.

17. The machine-readable medium of claim 16, wherein the one or more command line operations make reference to the one or more environment variables.

18. The machine-readable medium of claim 15, wherein said original command file includes:
   a header containing a predetermined set of commands;
   a body containing commands for accessing the configuration information and making the configuration information available through temporary environmental variables; and
   a footer containing commands for cleaning up a local environment.

19. The machine-readable medium of claim 15, wherein the data store comprises a Windows Registry.

20. A machine-readable medium having stored thereon data representing sequences of instructions, the sequences of instructions which, when executed by a processor, cause the processor to:
   define a scope for one or more temporary environment variables;
   create a temporary command file including command line operations contained in a body of an original command file by executing a command file generator program from within the original command file, the command line operations referring to the one or more temporary environment variables;
   execute the temporary command file; and
   during execution of the original command file, branch around the command line operations copied from the body of the original command file.

21. The machine-readable medium of claim 20, the sequences of instructions further causing the processor to, prior to said executing the temporary command file, retrieve configuration information to be associated with the one or more temporary environment variables from a data store by accessing the data store through an Application Programming Interface (API) associated with the data store.

22. The machine-readable medium of claim 21, wherein the scope of the one or more temporary environmental variables is local to the original command file and/or the temporary command file.

23. A machine-readable medium having stored thereon data representing sequences of instructions, the sequences of instructions which, when executed by a processor, cause the processor to:
   execute a program from within an original command file;
   the program creating a temporary command file;
   the program accessing configuration information from one or more data stores; and
   the program generating one or more command line operations for inclusion in the temporary command file based upon the configuration information retrieved from the one or more data stores.

24. The machine-readable medium of claim 23, wherein a name of the temporary command file is the same as the original command file, and wherein the temporary command file is created in a temporary directory separate from a directory in which the original command file is located.

25. The machine-readable medium of claim 23, wherein said accessing the configuration information from one or more data store is performed by way of one or more Application Programming Interfaces (APIs) associated with the one or more data stores.

* * * * *